United States Patent [19]

Otobe et al.

[11] Patent Number: 4,581,924

[45] Date of Patent: Apr. 15, 1986

[54] METHOD OF DETECTING OPENING OF A THROTTLE VALVE IN A FULLY CLOSED POSITION IN AN INTERNAL COMBUSTION ENGINE

[75] Inventors: Yutaka Otobe, Shiki; Makoto Hashiguchi, Kawagoe, both of Japan

[73] Assignee: Honda Giken Kogyo K.K., Tokyo, Japan

[21] Appl. No.: 736,687

[22] Filed: May 22, 1985

[30] Foreign Application Priority Data

May 25, 1984 [JP] Japan ................................ 59-106108

[51] Int. Cl.[4] ............................................ G01M 15/00

[52] U.S. Cl. ....................................... 73/118; 123/493

[58] Field of Search ...................... 73/118, 117.3, 116; 123/480, 486, 493

[56] References Cited

U.S. PATENT DOCUMENTS

| | | | |
|---|---|---|---|
| 4,359,894 | 11/1982 | Ikeura et al. | 73/118 |
| 4,515,009 | 5/1985 | Hasegawa et al. | 73/118 |

FOREIGN PATENT DOCUMENTS 206835 5/1982 Japan .

*Primary Examiner*—Jerry W. Myracle

*Attorney, Agent, or Firm*—Arthur L. Lessler

[57] ABSTRACT

A method of detecting the opening of a throttle valve in a fully closed position in an internal combustion engine. A first predetermined opening value larger than the minimum opening value of the throttle value determined by structural factors is stored as an initial value of a fully closed position-discriminating variable, while a second predetermined opening value smaller than the minimum opening value is stored as an initial value of a stored opening value of the throttle valve in the fully closed position detected by a throttle valve opening sensor. The fully closed position-discriminating variable is updated or set to a newly detected throttle valve opening value when the latter is smaller than the former. Then, the stored opening value of the fully closed throttle valve is updated or set to the thus updated fully closed position-discriminating variable when the latter continues to be substantially equal to throttle valve opening values subsequently detected over a predetermined period of time after the updating of the fully closed position-discriminating variable has been carried out.

3 Claims, 8 Drawing Figures

METHOD OF DETECTING OPENING OF A THROTTLE VALVE IN A FULLY CLOSED POSITION IN AN INTERNAL COMBUSTION ENGINE

BACKGROUND OF THE INVENTION

This invention relates to a method of detecting the opening of a throttle valve in a fully closed position in an internal combustion engine, which can detect the valve opening in an accurate manner.

In fuel supply control for internal combustion engines, it is required to determine with accuracy whether or not the throttle valve is actually in a fully closed position when the engine is in a decelerating condition for instance. To this end, Japanese Provisional Patent Publication No. 58-206835 has been proposed, which comprises detecting whether or not the throttle valve is in a substantially fully closed position, determining that the engine is in a decelerating condition when the throttle valve is determined to be in the substantially fully closed position and at the same time the engine speed is decreasing toward an idling speed, and interrupting the fuel supply to the engine to thereby improve the emission characteristic and fuel economy of the engine.

To ascertain whether or not the throttle valve is in a fully closed position, it is already known to determine whether or not a throttle opening value detected by a throttle opening sensor, which may be connected to the valve shaft of the throttle valve, e.g. a potentiometer, is smaller than or equal to a fully closed position-discriminating value which is the sum of a fully closed position-indicative value stored beforehand and a predetermined value. However, the actual position of the fully closed throttle valve can differ between individual throttle valves, and also vary with aging, e.g. mounting tolerances of the throttle valve and the throttle opening sensor, adhesion of dust or carbon to the throttle valve, and wear of component parts of the throttle valve.

Therefore, if a fixed value is used as the fully closed position-discriminating value, disadvantageously the throttle valve can wrongly be determined to be in a position other than the fully closed position though the valve is actually fully closed, due to aging change in the actual fully closed position of the throttle valve or a like cause. In order to ensure accurate detection of the fully closed position of the throttle valve, a method has been proposed by U.S. Pat. No. 4,359,894 wherein the smallest one of detected values of the throttle valve opening is stored, and when a newly detected value is smaller than the presently stored smallest value, the former is stored as the up-to-date smallest value. Further, a method has also been proposed by U.S. Ser. No. 456,605 filed Jan. 10, 1984, now U.S. Pat. No. 4,515,009 wherein a detected value of the throttle valve opening is newly stored as the smallest value in place of the presently stored smallest value only when the detected value keeps the same value smaller than the presently stored smallest value over a predetermined period of time, so as to avoid erroneous updating of the smallest stored value due to noise or other disturbances.

On the other hand, when a load creating equipment such as an air conditioner is operated to apply a load on the engine during idling operation, the resulting increased engine load can cause a drop in the engine speed, making the engine operation unstable. To overcome this disadvantage, it has been proposed, e.g. by Japanese Utility Model Publication No. 47-38678 and Japanese Provisional Patent Publication No. 50-70740, to forcedly open the throttle valve to a required degree during operation of the load creating equipment, to thereby increase the quantity of intake air for the engine for prevention of a decrease in the idling speed.

Further, an engine control method has been proposed by Japanese Utility Model Publication No. 55-10595, which is adapted to forcedly open the throttle valve to a required degree at restarting of the engine in a hot condition until the engine temperature drops below a predetermined value, so as to eliminate vapor lock badly affecting the startability and driveability of the engine.

According to these proposed methods, the phenomenon can occur that the throttle valve is forcedly opened upon starting of the engine, depending upon the operative state of the air conditioner or the engine temperature, and then the valve is kept open. On such occasion, if any of the proposed methods for detecting the fully closed throttle valve position is executed, the valve opening degree of the forcedly opened throttle valve then assumed can be wrongly regarded as the actual throttle opening value indicative of the fully closed position, and then stored as the smallest value. If such erroneous value is stored, a throttle opening value detected thereafter will then be smaller than the fully closed position-discriminating value set by the use of the erroneously stored value when the load creating equipment is at rest, for instance, causing a wrong diagnosis that the engine is in a decelerating condition, to interrupt the fuel supply to the engine, even when the engine is actually not in a decelerating condition.

SUMMARY OF THE INVENTION

It is the object of the invention to provide a method of detecting the opening of a throttle valve in an internal combustion engine, which is capable of avoiding a wrong determination that the throttle valve is in a fully closed position immediately after the start of the engine, and detecting with accuracy the actual fully closed position of the throttle valve which can vary due to wear, etc.

The present invention provides a method of detecting the opening of a throttle valve in a fully closed position in an internal combustion engine having an intake passage in which the throttle valve is arranged, and sensor means for detecting the opening of the throttle valve, the throttle valve having a minimum opening value thereof determined by structural factors, wherein the opening of the throttle valve is detected by the sensor means and stored, and when a presently detected value of the opening is smaller than a previously detected and presently stored one, the former is stored as a value indicative of the opening of the throttle valve in the fully closed position. The method is characterized by comprising the following steps: (a) storing a first predetermined opening value larger than the above minimum opening value of the throttle valve, as an initial value of a fully closed position-discriminating variable, (b) storing a second predetermined opening value smaller than the minimum opening value of the throttle valve as an initial value of the above stored opening value of the throttle valve in the fully closed position, (c) comparing an opening value of the throttle valve newly detected by the sensor means with the fully closed position-discriminating variable, (d) updating the fully closed position-discriminating variable by setting same to the newly detected opening value when the latter is smaller than the former, (e) determining whether or not the fully closed position-discriminating variable thus updated continues to be substantially equal to opening values of the throttle valve subsequently detected by the sensor means over a predetermined period of time after the updating of the fully closed position-discriminating variable in the step (d) has been carried out, and (f) updating the stored opening value of the throttle valve in the fully closed position by setting same to the updated fully closed position-discriminating variable when the step (e) provides an affirmative answer.

Preferably, the engine includes means for interrupting the fuel supply to the engine when the engine is in a decelerating condition which is fulfilled when at least a throttle valve opening value detected by the sensor means is smaller than or equal to a second variable different from the first-mentioned variable and indicative of a substantially fully closed position of the throttle valve. The second variable is set at the sum of the stored opening value of the throttle valve in the fully closed position and a third predetermined opening value.

Still preferably, the engine is installed in an automotive vehicle having a load creating equipment which applies a load to the engine when operated, and the engine includes means for forcedly opening the throttle valve to a predetermined degree during operation of the load creating equipment. The predetermined degree has a value larger than the sum of the aforementioned minimum opening value of the throttle valve and the third predetermined opening value.

The above and other objects, features and advantages of the invention will be more apparent from the ensuing detailed description taken in conjunction with the accompanying drawings.

DETAILED DESCRIPTION

The invention will now be described in detail with reference to the drawings.

Figure 1:
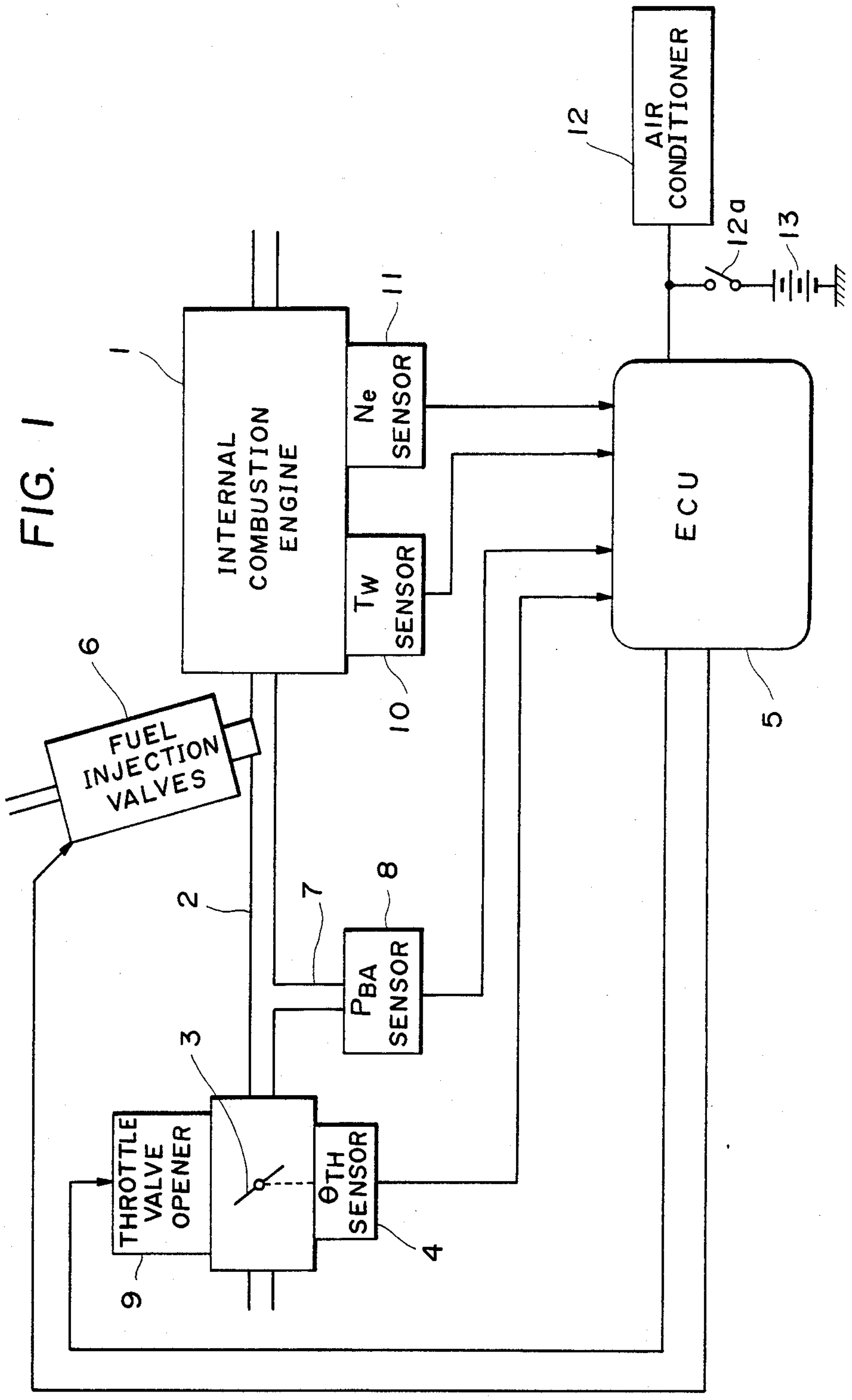
FIG. 1 is a block diagram illustrating the whole arrangement of a fuel supply control system to which is applied the method according to the invention.

Referring first to FIG. 1, there is illustrated the whole arrangement of a fuel supply control system to which is applied the method of the invention. Reference numeral 1 designates an internal combustion engine to which is connected an intake passage 2 having a throttle valve 3 arranged therein. A throttle valve opening (θTH) sensor 4, which may be formed of a potentiometer, is connected to the throttle valve 3 for detecting its valve opening and is electrically connected to an electronic control unit (hereinafter called "the ECU") 5, to supply same with a signal indicative of the throttle valve opening detected thereby. Fuel injection valves 6 are each arranged in the intake passage 2 at a location slightly upstream of an intake valve, not shown, of a corresponding one of the engine cylinders, not shown, and between the engine 1 and the throttle valve 3, for fuel supply to the corresponding engine cylinder. Each of the fuel injection valves 6 is connected to a fuel pump, not shown, and is electrically connected to the ECU 5, in a manner having their valve opening periods or fuel injection quantities controlled by signals supplied from the ECU 5.

An absolute pressure (PBA) sensor 8 communicates through a conduit 7 with the interior of the intake passage 2 at a location downstream of the throttle valve 3. This sensor 8 is adapted to detect absolute pressure PBA in the intake passage 2 and apply an electrical signal indicative of the detected absolute pressure to the ECU 5. An engine cooling water temperature (TW) sensor 10, which may be formed of a thermistor or the like, is mounted on the main body of the engine 1 in a manner embedded in the peripheral wall of an engine cylinder having its interior filled with cooling water, for applying an electrical output signal indicative of the detected water temperature to the ECU 5.

An engine rotational speed (Ne) sensor 11 is arranged on a camshaft, not shown, of the engine 1 or a crankshaft of same, not shown, and adapted to generate one pulse at one of particular crank angles each time the engine crankshaft rotates through 180 degrees, i.e. one pulse of the top-dead-center position (TDC) signal. The pulses generated by the sensor 11 are supplied to the ECU 5.

Reference numeral 12 denotes a load creating equipment driven by the engine 1, for instance, an air conditioner. When a power switch 12*a* of the air conditioner 12 is closed to establish electrical connection of an electromagnetic clutch, not shown, of the air conditioner 12 with a battery 13, an on-state signal is supplied from the switch 12*a* to the ECU 5. Further electrically connected to the ECU 5 is a solenoid control valve (hereinafter merely called "the solenoid valve") 95 of throttle valve-forced opener means 9 which is operatively connected to the throttle valve 3.

Figure 2:
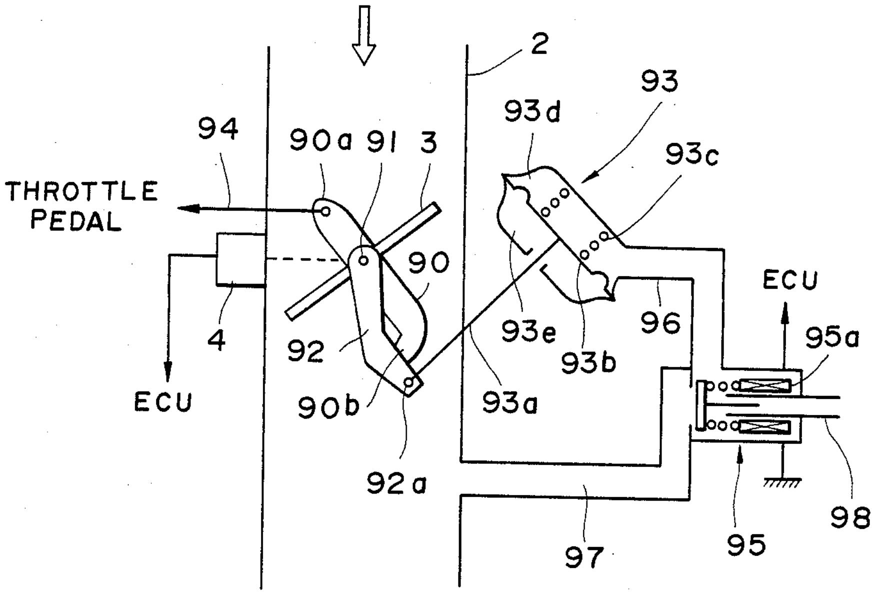
FIG. 2 is a view showing the arrangement of throttle valve-forced opener means appearing in FIG. 1.

As shown in detail in FIG. 2, the throttle valve-forced opener means 9 comprises the solenoid valve 95 and a vacuum-responsive actuator 93. The throttle valve 3 is formed integrally with a lever 90 for rotating the valve 3 about a fulcrum shaft 91. Another lever 92 is mounted at its one end on the fulcrum shaft 91 and has an arm 92*a* at its other end to which is connected a rod 93*a* of the vacuum-responsive actuator 93. The lever 90 extends in opposite directions with respect to the fulcrum shaft 91, and is connected at its one end 90*a* to a wire cable 94 connected to a throttle pedal, not shown, and has its other end 90*b* disposed in urging contact with the arm 92*a* of the lever 92 so that pivotal displacement of the lever 90, i.e. the throttle valve 3, toward a closed position is limited by the lever 92.

The vacuum-responsive actuator 93 comprises the rod 93*a* disposed to pull up and push down the lever 92, a diaphragm 93*b* connected to the rod 93*a* and displaceable by synthetic operating pressure of intake passage vacuum pressure and atmospheric pressure, which is controlled by the solenoid valve 95, and a spring 93*c* urging the diaphragm 93*b* in a direction of pushing down the lever 92 through the rod 93*a*. The diaphragm 93*b* disposed within the casing of the actuator 93 cooperates with the same casing to define at its opposite sides a vacuum chamber 93*d* and an atmospheric pressure chamber 93*e* communicating with the atmosphere. The vacuum chamber 93*d* is communicated through pipes 96 and 97 with the intake passage 2 at a location downstream of the throttle valve 3.

The solenoid valve 95 is arranged at the junction of the two pipes 96, 97, and operable such that when the solenoid valve 95 is energized, the pipe 96 is communicated with the pipe 97 and at the same time disconnected from an atmospheric pressure-intake passage 98 so as to supply the chamber 93*d* with the intake passage negative pressure, while when the valve 95 is deenergized, the pipe 96 is disconnected from the pipe 97 and simultaneously connected to the atmospheric pressure-intake passage 98, thereby supplying the chamber 93*d* with the atmospheric pressure. The solenoid valve 95 has its solenoid 95*a* electrically connected to the ECU 5, as mentioned hereinbefore.

When the switch 12*a* is closed to operate the air conditioner 12 through the engine 1, the solenoid valve 95 is energized to introduce the intake passage negative pressure into the chamber 93*d* of the vacuum responsive actuator 93. As a consequence, the diaphragm 93*b* is displaced so that the lever 92 is pivotally displaced by the rod 93*a* in the counterclockwise direction through a predetermined angle, thereby limiting displacement of the lever 90, i.e. the throttle valve 3, in the clockwise direction. Thus, when the switch 12*a* of the air conditioner 12 is closed, the throttle valve 3 is forcedly opened to a predetermined degree to increase the intake air quantity so as to ensure stable idling operation of the engine during operation of the air conditioner 12.

The ECU 5 in FIG. 1 operates on the engine parameter signals supplied from various sensors such as the throttle valve opening sensor 4, and the air conditioner switch 12*a*, to carry out updating of a stored value θIDLL indicative of a fully closed position of the throttle valve 3 by replacing a presently stored value with a newly detected value indicative of a fully closed position of the valve, while determining operating conditions of the engine including a fuel cut-effecting condition to calculate the fuel injection period TOUT for the fuel injection valves 6 by the use of the following equation:

$$TOUT = Ti \times K1 + K2 \quad (1)$$

where Ti represents a basic value of the fuel injection period which is read from a memory within the ECU 5 in dependence on the intake passage absolute pressure PBA and the engine speed Ne, and K1, K2 represent correction coefficients and correction variables, respectively, values of which are calculated in response to values of the engine parameter signals from the aforementioned various sensors, so as to achieve optimum operating characteristics of the engine such as startability, emission characteristics, fuel consumption and acceleration. When it is determined that the engine is in the fuel cut-effecting condition, the fuel injection period value TOUT is set to zero.

The ECU 5 generates driving signals corresponding to the fuel injection period values TOUT calculated as above, and supplies same to the fuel injection valves 6 to drive same.

Figure 3:
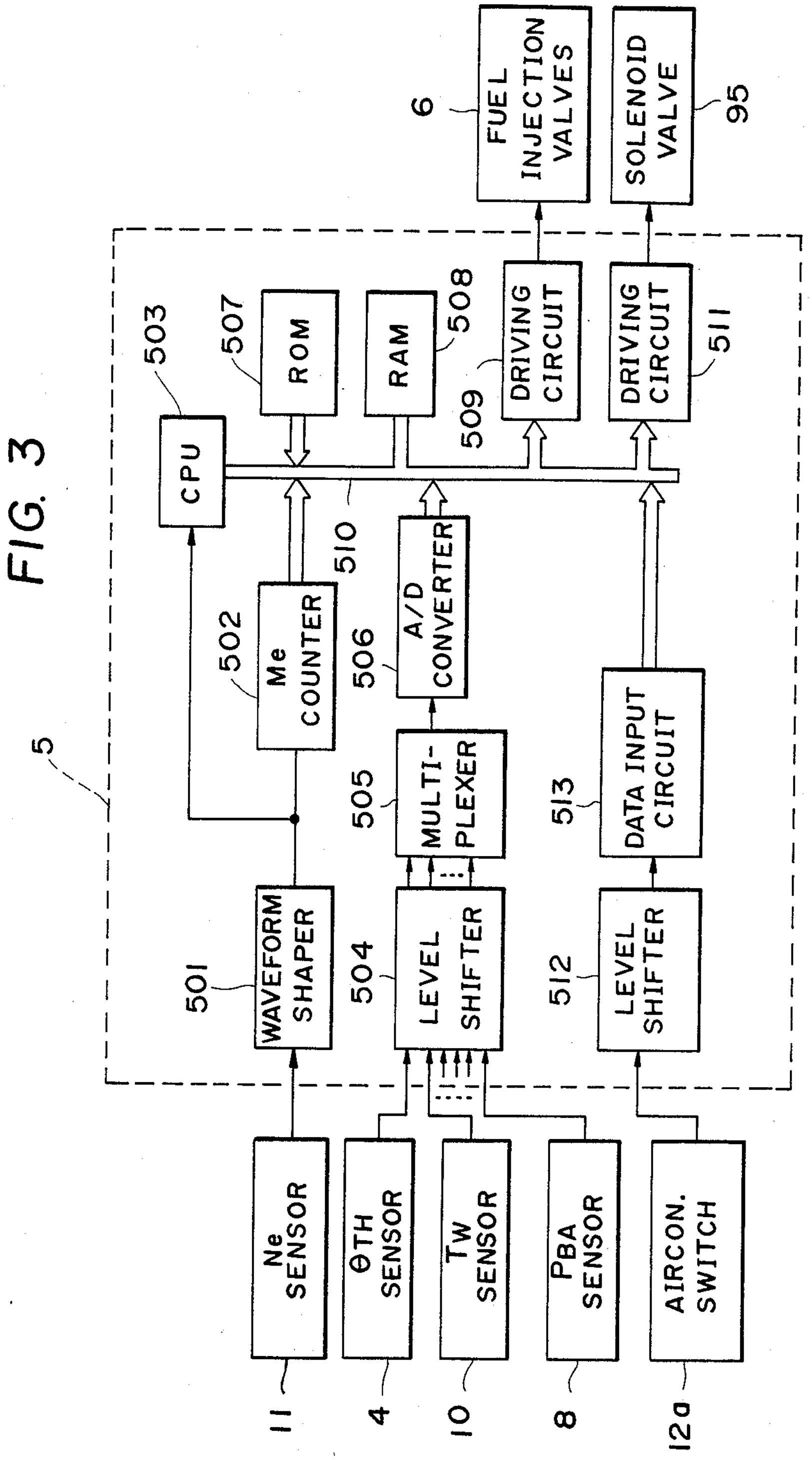
FIG. 3 is a circuit diagram showing the interior construction of an electronic control unit (ECU) appearing in FIG. 1.

FIG. 3 shows a circuit configuration within the ECU 5 in FIG. 1. An output signal from the Ne sensor 11 in FIG. 1 is applied to a waveform shaper 501, wherein it has its pulse waveform shaped, and supplied to a central processing unit (hereinafter called "the CPU") 503, as the TDC signal, as well as to an Me value counter 502. The Me value counter 502 counts the interval of time between a preceding pulse of the TDC signal and a present pulse of the same signal, inputted thereto from the Ne sensor 11, and therefore its counted value Me is proportional to the reciprocal of the actual engine speed Ne. The Me value counter 502 supplies the counted value Me to the CPU 503 via a data bus 510.

The respective output signals from the throttle valve opening (θTH) sensor 4, the absolute pressure (PBA) sensor 8, the engine cooling water temperature (TW) sensor 10, etc. have their voltage levels shifted to a predetermined voltage level by a level shifter unit 504 and successively applied to an analog-to-digital (A/D) converter 506 through a multiplexer 505. The A/D converter 506 successively converts into digital signals analog output voltages from the aforementioned various sensors, and the resulting digital signals are supplied to the CPU 503 via the data bus 510.

An on- and off-state signal from the air conditioner switch 12*a* in FIG. 1 has its voltage level shifted to a predetermined voltage level by a level shifter unit 512, then is applied to a data input circuit 513 to be converted into a suitable signal, and supplied to the CPU 503 via the data bus 510.

Further connected to the CPU 503 via the data bus 510 are a read-only memory (hereinafter called "the ROM") 507, a random access memory (hereinafter called "the RAM") 508, and two driving circuits 509 and 511. The RAM 508 temporarily stores various calculated values from the CPU 503, etc., while the ROM 507 stores a control program executed within the CPU 503, maps of values of the basic fuel injection period Ti for the fuel injection valves 6, an initial value θIDL0 to be used as the stored value θIDLL indicative of a fully closed position of the throttle valve, hereinafter referred to, etc. The CPU 503 executes the control program stored in the ROM 507 in synchronism with generation of pulses of the TDC signal to calculate the fuel injection period TOUT for the fuel injection valves 6 in response to the various engine operation parameter signals, and supplies control signals corresponding to the calculated fuel injection period value to the driving circuit 509 via the data bus 510. The driving circuit 509 in turn supplies driving signals corresponding to the calculated TOUT value to the fuel injection valves 6 to drive same. Further, when the on-state signal is inputted to the CPU 503 from the air conditioner switch 12*a*, the CPU 503 supplies a control signal to the driving circuit 511 which in turn supplies a driving signal to the solenoid valve 95 to energize same.

Figure 4:
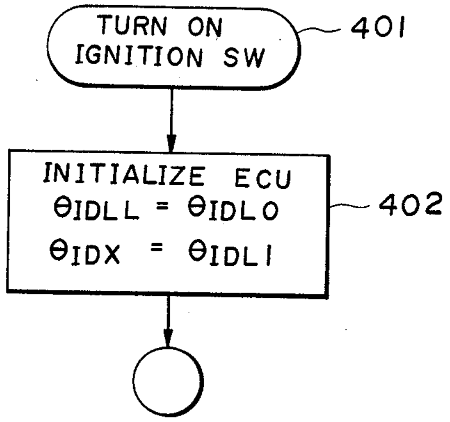
FIG. 4 is a flowchart showing a program for initializing the ECU, which is executed within the ECU upon closing of the ignition switch of the engine.
Figure 5:
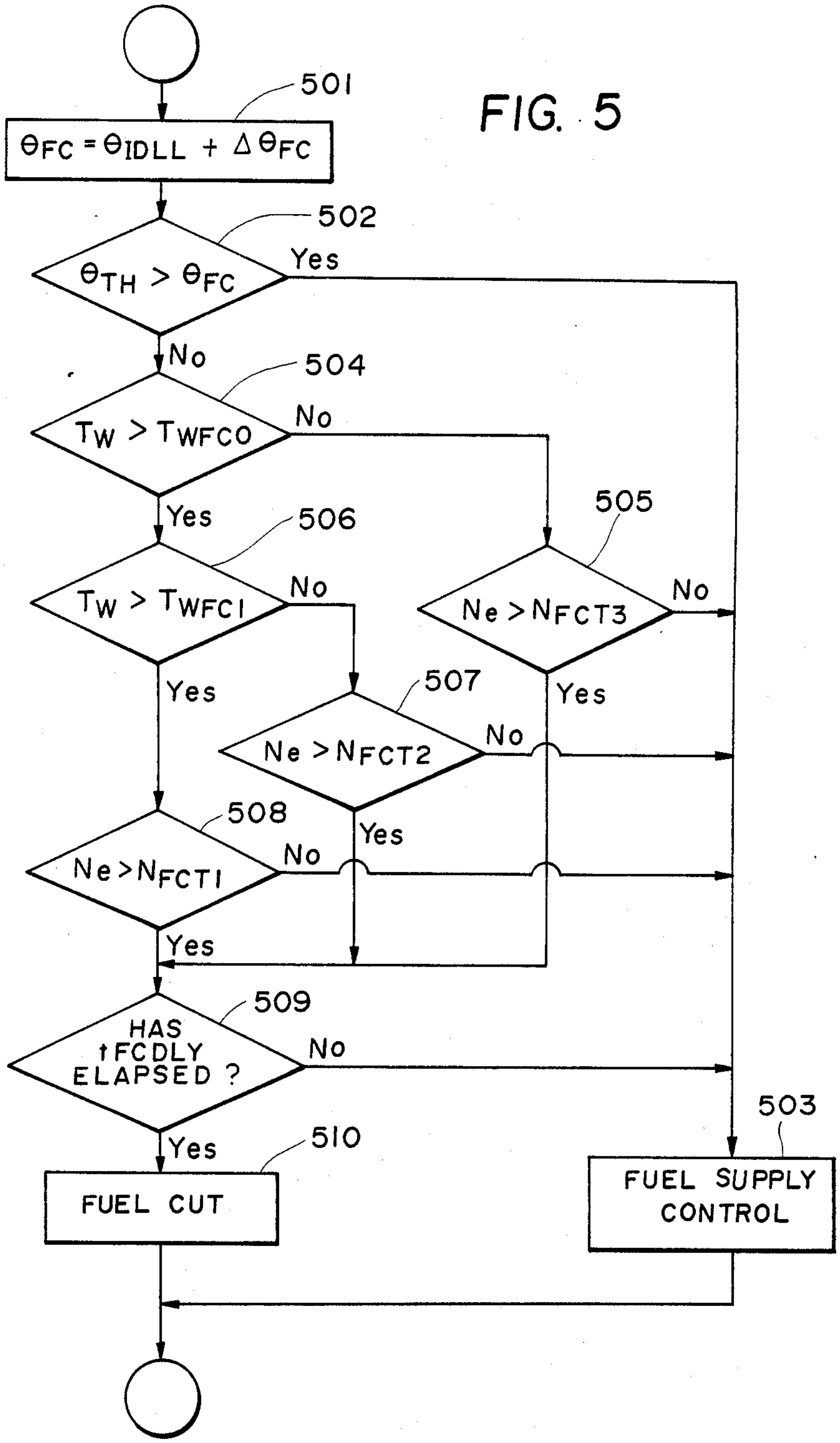
FIG. 5 is a flowchart showing a manner of determining whether or not the engine is in a fuel cut-effecting condition at deceleration, by the use of a stored value θIDLL indicative of the fully closed throttle valve opening.
Figure 6:
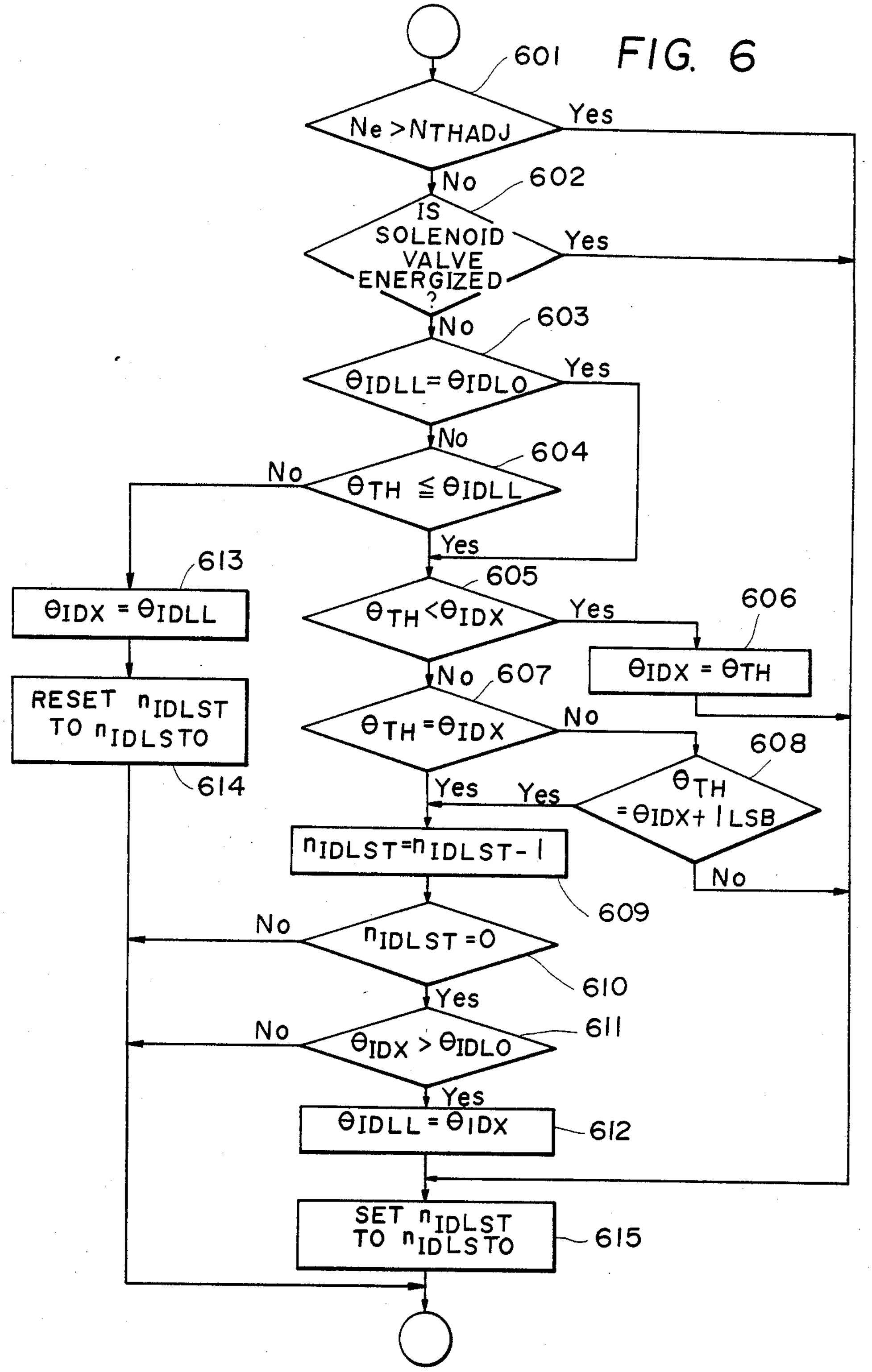
FIG. 6 is a flowchart showing a manner of detecting a value of the opening of the throttle valve opening in a fully closed position.

FIGS. 4–6 are flowcharts showing a control program including a routine for carrying out updating of the opening value of the throttle valve in the fully closed position. This program is executed upon generation of each pulse of the TDC signal.

First, as shown in FIG. 4, when an ignition switch, not shown, of the engine is turned on or closed (step 401), the ECU 5 in FIG. 1 is initialized with the supply of electric power, and the value θIDLL indicative of the fully closed throttle valve opening and a value θIDX for determining whether to update the fully closed throttle valve opening value θIDLL are set to respective initial values θIDL0 and θIDL1 stored in the ROM 507 in FIG. 3 (step 402). The value θIDL0 is set at a value smaller than the actual minimum possible opening of the throttle valve 3 in the fully closed position, 0° for instance, while the value θIDL1 is set at a value larger than the actual minimum possible opening, 1.7 for instance. The actual minimum possible opening of the throttle valve 3 is a minimum opening value of the throttle valve 3 in the fully closed position which is determined by structural factors such as configurations of the throttle valve and the inner wall of the intake passage and the relative locations of them.

The above actual minimum possible valve opening theoretically should be a design value assumable when the throttle valve is in the fully closed position. But, the actual opening of the throttle valve in the fully closed position can deviate from the design value due to mounting tolerances of the throttle valve 3, adhesion of dust to the valve, aging wear of the valve, etc. Therefore, the values θIDL0 and θIDL1 are set at values outside a possible variable range of the actual minimum possible opening of the fully closed throttle valve.

FIG. 5 is a flowchart showing a manner for determining whether or not the engine is operating in a condition in which fuel cut should be carried out, on the basis of the fully closed throttle valve opening stored value θIDLL.

First, at the step 501, setting of a fuel cut-determining throttle opening value θFC is effected. The value θFC is set to such a value that the throttle valve 3 can be regarded as substantially fully closed, that is, it is set to the sum of the fully closed throttle valve opening stored value θIDLL and a predetermined value ΔθFC (e.g. 2.5°). In practice, the predetermined value θFC is set at values different between entrance and departure of the engine operation into and from the fuel cut-effecting region, so as to provide a hysteresis characteristic. Then, it is determined at the step 502 whether or not an actual value θTH of the throttle valve opening is larger than the fuel cut-determining value θFC. If the actual throttle opening is larger than the value θFC, it is judged that the engine is not in the fuel cut-effecting condition, and accordingly, the program proceeds to the step 503, to calculate the fuel injection period value TOUT for the fuel injection valves 6 by the use of the equation (1).

When it is determined at the step 502 that the actual throttle opening value θTH is smaller than the fuel cut-determining value θFC, the steps 504–508 are carried out to determine whether or not the engine speed Ne is larger than a predetermined fuel cut-determining value NFCT1, NFCT2 or NFCT3 set in response to the engine cooling water temperature TW. That is, at the step 504, it is determined whether or not the engine cooling water temperature TW is higher than a predetermined value TWFC0 (e.g. 65° C.). When the temperature value TW is lower than or equal to the predetermined value TWFC0, the program proceeds to the step 505 to determine whether or not the engine speed Ne is higher than a predetermined speed NFCT3 (e.g. 2200 rpm), while when the temperature value TW is higher than the predetermined value TWFC0, the step 506 is executed to determine whether or not the engine cooling water temperature TW is higher than a predetermined value TWFC1 (e.g. 80° C.). When the temperature value TW is lower than or equal to the predetermined value TWFC1 (i.e. TWFC0<TW≦TWFC1), the program proceeds to the step 507 to determine whether or not the engine speed Ne is higher than a predetermined speed NFCT2 (e.g. 1400 rpm), while when the temperature value TW is higher than the predetermined value TWFC1, the step 508 is executed to determine whether or not the engine speed Ne is higher than a predetermined speed NFCT3 (e.g. 900 rpm). If it is determined at the step 505, 507 or 508 that the engine speed Ne is lower than or equal to the predetermined speed NFCT3, NFCT2 or NFCT1, it is judged that the engine is in a low speed condition in which fuel cut should not be carried out, and therefore, the step 503 is executed to carry out the fuel supply control. On the other hand, if it is determined at the step 505, 507 or 508 that the engine speed Ne is higher than the predetermined value NFCT3, NFCT2 or NFCT1, the step 509 is executed to determine whether or not a predetermined period of time tFCDLY (e.g. 2 seconds) has elapsed since the engine entered the fuel cut-effecting condition for the first time. This determination is made in order to avoid the phenomenon that fuel cut is wrongly carried out due to inputting of an erroneous signal caused by noise or the like to the ECU or the CPU. When the predetermined period of time tFCDLY has not yet elapsed, the step 503 is executed, while when the predetermined period of time tFCDLY has elapsed, the program proceeds to the step 510 to carry out fuel cut.

The reason for providing the determinations of the steps 505, 507 and 508 as to fulfillment of the fuel cut-effecting condition by the use of the predetermined value NFCT which is set to higher values with a decrease in the engine cooling water temperature TW is as follows: When the engine cooling water temperature TW representative of the engine temperature is low, sliding parts of the engine have large frictional resistance making the engine operation unstable. Therefore, if the predetermined value NFCT is not set to a sufficiently large value before completion of warming-up of the engine, there can easily occur engine stall upon disengagement of the clutch while fuel cut is being carried out. For this reason, the predetermined fuel cut-determining value NFCT is set to a higher value in reverse proportion to the engine cooling water temperature TW, to thereby avoid engine stall after fuel cut operation as well as improve the driveability of the engine. On the other hand, setting of the fuel cut-determining value NFCT to a smaller value when the engine cooling water temperature is high serves to avoid an increase in the noxious ingredient amount in the exhaust gases as well as to reduce the fuel consumption to a minimum possible level. The fuel cut-determining values employed in the steps 504–508 may each be set to values different between entrance and departure of the engine operation into and from the fuel cut-effecting region, so as to provide a hysteresis characteristic.

FIG. 6 shows a manner of updating the fully closed throttle valve opening stored value θIDLL.

First, at the steps 601 and 602, a determination is made as to whether or not the engine is operating in a condition in which the updating of the value θIDLL is to be executed. To be specific, it is determined at the step 601 whether or not the engine speed Ne is higher than a predetermined value NTHADJ (e.g. 2000 rpm). When the engine speed Ne is higher than the predetermined value NTHADJ, the CPU judges that execution of the updating is unnecessary, and therefore, the count value nIDLST of a program down counter for setting a predetermined period of time, hereinafter referred to, is set to an initial value nIDLST0 (e.g. 10) at the step 615, followed by termination of execution of the present program. This program is executed to overcome the disadvantage that the detected value of the fully closed throttle valve opening finely varies due to the presence of fine particles of the resistance material formed by frictional contact between the resistor and the slider of the throttle valve opening sensor 4 in FIG. 1, formed by a potentiometer or a like meter, when the throttle valve is held in the fully closed position and thus keeps the same valve opening during low speed operation of the engine. On the other hand, when the engine speed Ne is higher than the predetermined value NTHADJ, fine variation of the detected value of the fully closed throttle valve opening does not substantially badly affect the determination as to whether or not the engine is in a fuel cut-effecting condition, etc. That is, there is no fear of engine stall even with fine variation in the fully closed position-indicative value at such high engine speed. Therefore, when the engine speed Ne is higher than the predetermined value NTHADJ, the steps 602-614 following the step 601 are not executed.

Then, a determination is made as to whether or not the solenoid valve 95 of the throttle valve-forced opener means 9 is in an energized state (step 602). When the solenoid valve 95 is energized, the throttle valve is forcedly opened to a predetermined degree. Accordingly, execution of the present program is terminated after execution of the step 615, since if the steps 603 et seq. are executed on this occasion, the throttle valve 3 can be wrongly determined to be in a fully closed position. The predetermined degree to which the throttle valve 3 is forcedly opened at energization of the solenoid valve 95 is set at a value larger than the fuel cut-determining value θFC set at the step 501 in FIG. 5.

When the answers to the questions at the steps 601 and 602 are both negative or no, the program proceeds to the step 603 to determine whether or not the stored value θIDLL indicative of the fully closed throttle valve opening is equal to the initial value θIDL0 set at the time of initialization of the ECU 5. If the stored value θIDLL is equal to the initial value θIDL0, the program skips the step 604 over to the step 605 wherein a determination is made as to whether or not the detected value θTH of the throttle valve opening is smaller than the updating-effecting value θIDX.

Figure 7:
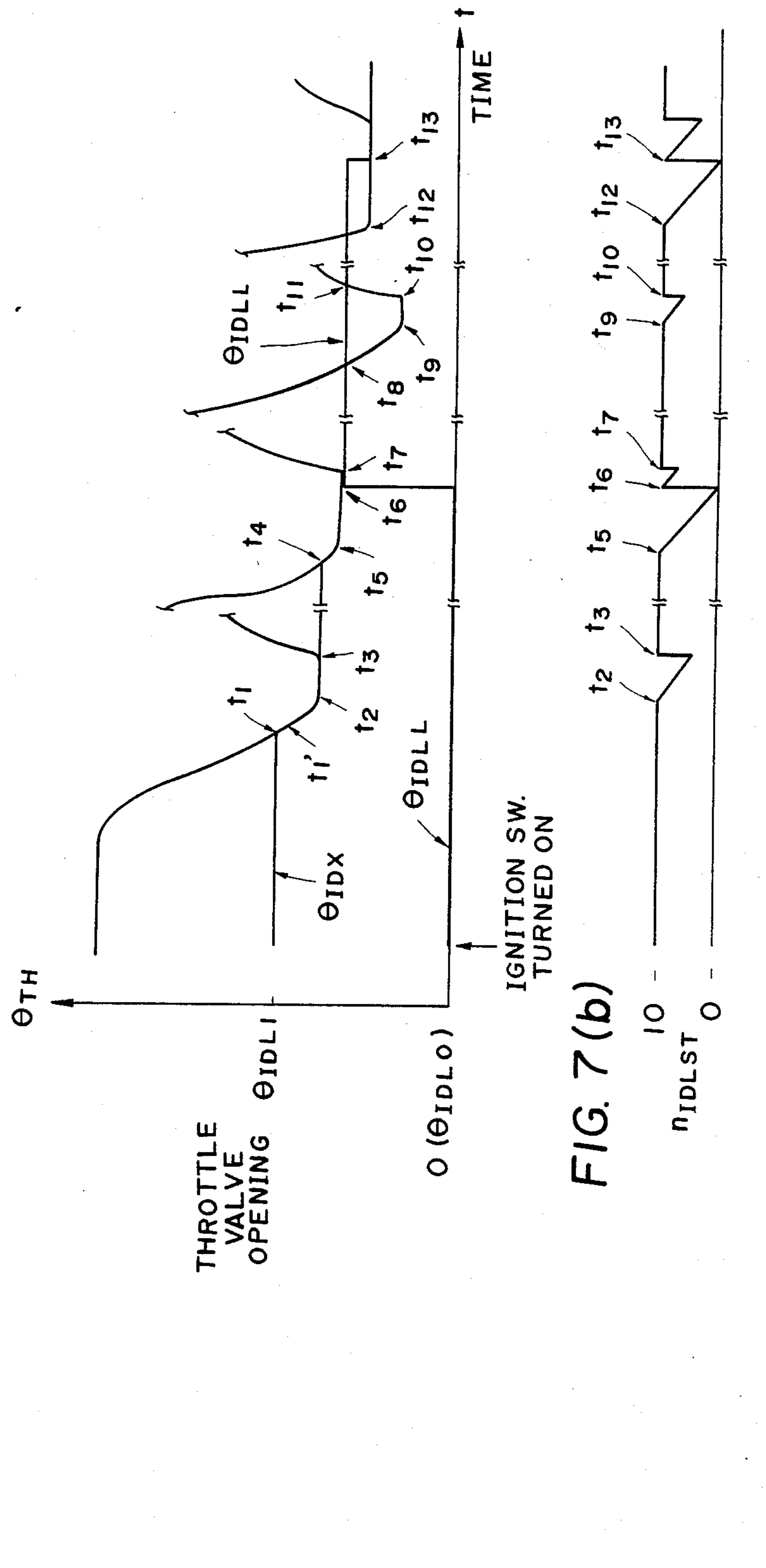
FIG. 7, including FIGS. 7(*a*) and 7(*b*), is a timing chart showing changes in the stored value θIDLL indicative of the fully closed throttle valve opening, the detected opening value θTH of the throttle valve, and a count value nIDLST of a program down counter, relative to the lapse of time.

FIG. 7 is a timing chart showing changes in the detected throttle valve opening value θTH relative to the lapse of time. As shown in the figure, immediately after the ignition switch has been turned on, the updating-effecting value θIDX is set to the aforementioned initial value θIDL1 (e.g. 1.7°) upon initialization of the ECU 5. As long as the detected throttle opening value θTH remains above the updating-effecting value θIDX until the time of t1 in FIG. 7 is reached, the answer to the question at the step 605 is negative (no), and also at the steps 607 and 608 provide negative answers since the throttle opening value θTH then assumed is not equal to or substantially equal to the updating-effecting value θIDX, followed by execution of the step 615. That is, as long as the detected throttle opening value θTH remains above the updating-effecting value θIDLX, updating of the stored value θIDLL is not effected.

Then, when the throttle valve opening θTH decreases below the updating-effecting value θIDX at the time t1, the determination at the step 605 provides an affirmative answer (yes) in the loop executed upon generation of a TDC signal pulse immediately following the time t1, i.e. at the time of t1'. On this occasion, the updating-effecting value θIDX is set to a throttle valve opening value θTH detected in the present loop (step 606), and the program proceeds to the step 615. When the throttle opening value θTH thereafter keeps decreasing with generation of the following TDC signal pulses, the updating-effecting value θIDX is set to the smaller values θTH at the step 606. When the detected throttle opening value θTH is maintained at a constant value after the time of t2, the answer to the question at the step 605 becomes negative or no, and the program proceeds to the step 607. Then, a determination is made as to whether or not the detected throttle opening value θTH is equal to the updating-effecting value θIDX at the step 607, and if the answer is no, the step 608 is executed to determine whether or not the detected value θTH is equal to the sum of the updating-effecting value θIDX and a minute value 1LSB. An analog signal indicative of the throttle opening from the throttle valve opening sensor 4 in FIG. 1 is converted into a corresponding digital signal by the A/D converter 506 in FIG. 3, as noted before. The minute value 1LSB corresponds to resolution of the A/D converter 506, that is, corresponds to 1 in the lowest place of the resulting digital output value (the least significant bit).

When the answer to the question at the step 607 or 608 is yes, that is, when the detected throttle opening value θTH is equal to or substantially equal to the updating-effecting value θIDX, the program proceeds to the step 609 wherein 1 is subtracted from the count value nIDLST of the program counter. Then, it is determined at the step 610 whether or not the count value nIDLST is equal to zero, and if the count value nIDLST is other than zero, execution of the present loop is terminated.

As long as the detected throttle opening value θTH maintains a value equal to or substantially equal to the updating-effecting value θIDX, the step 609 is repeatedly executed to further subtract 1 from the count value nIDLST (the time interval t2–t3 in FIG. 7(*b*)). When the throttle opening value θTH becomes larger than the updating-effecting value θIDX before the count value nIDLST is reduced to zero (t3 in FIG. 7), the results of determinations at the steps 607 and 608 both become negative, and accordingly the count value nIDLST is reset to the initial value nIDLST0 at the step 615, followed by termination of execution of the present program. On this occasion, the updating-effecting value θIDX is maintained at a throttle opening value θTH which has been set at the step 606 upon generation of a TDC signal pulse immediately following the time t2 in FIG. 7.

When the detected throttle opening value θTH again decreases below the updating-effecting value θIDX after the time t4 in FIG. 7, the answer to the question at the step 605 becomes yes, and thereafter the step 606 is repeatedly executed to update the determining value θIDX by setting same to smaller detected throttle opening values θTH. Thereafter, as long as the throttle opening value θTH detected upon generation of TDC signal pulses immediately following the time t5 keeps the same value, the step 609 is repeatedly executed to subtract 1 from the count value nIDLST. When the count value nIDLST is reduced to zero at the time t6 and accordingly the answer to the question at the step 610 becomes yes, the step 611 is executed to ascertain that the updating-effecting value θIDX is larger than the initial value θIDL0 (e.g. 0°) of the throttle opening value θIDLL, which was set at the step 402 in FIG. 4 upon initialization of the ECU 5. Then, the program proceeds to the step 612 to update the fully closed throttle valve opening θIDLL by setting same to an updating-effecting value θIDX set at the last execution of the step 606 (t6 in FIG. 7(*a*)), followed by execution of the step 615 wherein the count value nIDLST is reset to the initial value nIDLST0. A negative answer to the question at the step 611 means that an updating-effecting value θIDX set at the step 606 in response to the detected throttle opening value θTH is a value which cannot be assumed during normal operation of the engine. On this occasion, execution of the present program is terminated without executing the step 612.

Once the throttle opening value θIDLL is updated or set to an updating-effecting value θIDX, the answer to the question at the step 603 becomes negative (no) in the following loops, and accordingly the step 604 is executed to determine whether or not the detected throttle opening value θTH is smaller than or equal to the stored value θIDLL of the fully closed throttle valve opening. If, after the time t6, the throttle valve opening value θTH keeps the same value as it was at the time t5, 1 is repeatedly subtracted from the count value nIDLST at the step 609 (the time interval t6–t7 in FIG. 7(*b*)). When the throttle valve opening θTH shows a value larger than the fully closed throttle opening stored value θIDLL at and after the time t7, that is, when the answer to the question at the step 604 becomes negative, the program proceeds to the step 613 wherein the updating-effecting value θIDX is set to the fully closed throttle opening value θIDLL then stored, and the count value nIDLST is reset to the initial value nIDLST0 at the step 614, followed by termination of execution of the program.

If after the step 612 is executed to set the stored value θIDLL of the fully closed throttle opening to a value other than its initial value θIDL0, the detected throttle opening θTH assumes values smaller than the updating-effecting value θIDX set to the fully closed throttle valve opening stored value θIDLL (after t8 in FIG. 7(*a*)), and thereafter assumes values larger than the updating-effecting value θIDX (after t11) before the count value nIDLST of the program down counter is reduced to zero at the step 609 (between t9 and t10), the updating-effecting value θIDX is set to a detected value θTH immediately after the time t9 but it is again set to the fully closed throttle opening value θIDLL at the step 613 after the time of t11 in FIG. 7(*a*).

Thereafter, if the detected throttle opening value θTH decreases below the updating-effecting value θIDX and remains at the same until the count value nIDLST is reduced to zero (the time interval t12–t13 in FIG. 7), the fully closed opening-indicative value θIDLL is set to a smaller updating-effecting value θIDX at the step 612, which has been set to the thus decreased throttle opening value θTH, in the aforedescribed manner.

What is claimed is:

1. A method of detecting the opening of a throttle valve in a fully closed position in an internal combustion engine having an intake passage in which said throttle valve is arranged, and sensor means for detecting the opening of said throttle valve, said throttle valve having a minimum opening value thereof determined by structural factors, wherein the opening of said throttle valve is detected by said sensor means and stored, and when a presently detected value of the opening is smaller than a previously detected and presently stored one, the former is stored as a value indicative of the opening of said throttle valve in the fully closed position, the method comprising the steps of: (a) storing a first predetermined opening value larger than said minimum opening value of said throttle valve, as an initial value of a fully closed position-discriminating variable, (b) storing a second predetermined opening value smaller than said minimum opening value of said throttle valve as an initial value of said stored opening value of said throttle valve in the fully closed position, (c) comparing an opening value of said throttle valve newly detected by said sensor means with said fully closed position-discriminating variable, (d) updating said fully closed position-discriminating variable by setting same to said newly detected opening value when the latter is smaller than the former, (e) determining whether or not said fully closed position-discriminating variable thus updated continues to be substantially equal to opening values of said throttle valve subsequently detected by said sensor means over a predetermined period of time after the updating of said fully closed position-discriminating variable in the step (d) has been carried out, and (f) updating said stored opening value of said throttle valve in the fully closed position by setting same to said updated fully closed position-discriminating variable when the step (e) provides an affirmative answer.

2. A method as claimed in claim 1, wherein said engine includs means for interrupting the fuel supply to said engine when said engine is in a decelerating condition which is fulfilled when at least an opening value of said throttle valve detected by said sensor means is smaller than or equal to a second variable different from the first-mentioned variable and indicative of a substantially fully closed position of said throttle valve, said second variable being set at the sum of said stored value of said throttle valve in the fully closed position and a third predetermined opening value.

3. A method as claimed in claim 2, wherein said engine is installed in an automotive vehicle having a load creating equipment which applies a load to said engine when operated, said engine including means for forcedly opening said throttle valve to a predetermined degree during operation of said load creating equipment, said predetermined degree having a value larger than the sum of said minimum opening value of said throttle valve and said third predetermined opening value.

* * * * *